United States Patent
Kong et al.

(10) Patent No.: US 7,623,950 B2
(45) Date of Patent: Nov. 24, 2009

(54) CONFIDENCE BOOST FOR AUTOMOTIVE OCCUPANT CLASSIFICATIONS

(75) Inventors: Hongzhi Kong, Kokomo, IN (US);
William A. Bauson, Kokomo, IN (US);
Qin Sun, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 814 days.

(21) Appl. No.: 11/149,816

(22) Filed: Jun. 9, 2005

(65) Prior Publication Data
US 2006/0282201 A1    Dec. 14, 2006

(51) Int. Cl.
*G05D 1/00* (2006.01)
(52) U.S. Cl. .......................... 701/45; 701/47
(58) Field of Classification Search ............ 701/1, 701/45, 36, 47; 280/735; 180/271, 282, 180/274
See application file for complete search history.

(56) References Cited

U.S. PATENT DOCUMENTS

| | | | |
|---|---|---|---|
| 6,026,340 A | 2/2000 | Corrado et al. | |
| 6,459,974 B1 | 10/2002 | Baloch et al. | |
| 7,113,856 B2 * | 9/2006 | Theiss et al. | 701/45 |
| 7,278,657 B1 * | 10/2007 | McCurdy | 280/735 |
| 7,406,181 B2 * | 7/2008 | O'Boyle et al. | 382/104 |

OTHER PUBLICATIONS

European Patent Office Communication for Application No. 06076129.3-1264, dated Sep. 27, 2007, 6 pages.
EP Search Report dated Sep. 19, 2006.

* cited by examiner

*Primary Examiner*—Richard M. Camby
(74) *Attorney, Agent, or Firm*—Douglas D. Fekete

(57) ABSTRACT

The present invention relates to systems for determining the position and the type of an occupant in a vehicle. More specifically, the present invention provides an occupant position and type classification system including an occupant detection module, a processor in communication with the occupant detection module, and memory accessible by the processor and storing program instructions executable by the processor to perform the steps of categorizing the occupant into one of a plurality of static categories, each of the static categories including at least one class indicative of the occupant's type or position in the vehicle, and classifying the occupant into one of the classes.

12 Claims, 5 Drawing Sheets

CONFIDENCE BOOST FOR AUTOMOTIVE OCCUPANT CLASSIFICATIONS

TECHNICAL BACKGROUND

The present invention generally relates to occupant protection systems and more particularly relates to systems for determining the type and position of an occupant in a vehicle.

BACKGROUND OF THE INVENTION

Vehicle occupants rely on occupant protection systems to prevent injuries in a vehicle crash event. Occupant protection systems that are activated in response to a vehicle crash for the purpose of mitigating the vehicle occupant's injuries are well known in the art. Such systems may include front and side air bags as well as seat belt pretensioners and knee bolsters. Shown in FIG. 1, a prior art occupant protection system developed by the present applicant uses a stereo camera system and neural network classifier 10 to classify motor vehicle occupants. The inputs of classifier 10 are a set of extracted image features such as stereo image disparities, image edge density distribution, and image wavelet coefficients. Classifier 10 outputs a set of weighting parameters that are associated with desired classifications 20, which include Empty Seat (ES) classification 21, Adult Out Of Position (Adult_OOP) classification 22, Adult Normal or Twisted Position (Adult_NT) classification 23, Child Out Of Position (Child_OOP) classification 24, Child Normal or Twisted Position (Child_NT) classification 25, Rear Facing Infant Seat (RFIS) classification 26 and Forward Facing Infant (or Child) Seat (FFI(C)S) classification 27. The weighting parameter is a number between 0 and 1. A larger weighting parameter represents a higher probability that the object belongs to the associated class. Therefore, peak detector 30 detects the maximum weighting parameter, and the system provides classification 40 of an occupant by selecting the output class that is associated with the maximum weighting parameter among the seven classifications.

This prior art system is problematic because it has a tendency to make misclassifications when there is not a clear winner among the seven weighting parameters. This may occur if more than one of the seven weighting parameters have comparable dominant values or no dominant weighting parameters at all. Under this condition, classifier 10 is either incapable of making correct decisions with acceptable certainty or becomes confused completely and makes wrong decisions. For example, in many cases the related image features of an Adult_OOP classification 22 and a RFIS classification 26 can be similar. This similarity causes the weighting parameters of classifier's 10 output for the associated Adult_OOP classification 22 26 to be similar as well. Naturally, the competition between these two confused classes will result in either lower classification confidence, i.e., the system's ability to successfully use predetermined parameters in making classification 40, or misclassification. Although this condition can be made infrequent by proper training of neural network classifier 10, its occurrence certainly reduces the accuracy and robustness of the system. Due to the fact that the potential occupants may have infinite variables such as size, position, clothing, and shape while neural network classifier 10 has a finite training set, it is always possible that neural network classifier 10 may be exposed to its confused conditions.

Another problem with this prior art system is its classification instability. In some cases, image noise, temporal change in environment (e.g. lighting conditions or scene), or even the slight change of an occupant's position from a marginal condition may cause temporal misclassifications of the system. Again, this problem is related to the fact that the current system classifies the occupant regardless of the system's classification confidence.

SUMMARY OF THE INVENTION

The method and system of the present invention overcomes the problems in the prior art system by increasing the classification confidence, applying a classification locking mechanism with a high confidence event, and classifying an occupant based on a two-tiered classification scheme, thereby providing a more robust system. In one form of the present invention, a method of classifying an occupant of a motor vehicle is provided, the method including the steps of categorizing the occupant into one of a plurality of static categories, each of the static categories including at least one class indicative of the occupant's type or position in the vehicle, and classifying the occupant into one of the classes.

In another form, the present invention provides an occupant position classification system, the system including an occupant detection module that captures occupant images or signals; a processor in communication with the occupant detection module; and memory accessible by the processor and storing program instructions executable by the processor to perform the steps of categorizing the occupant into one of a plurality of static categories, each of the static categories including at least one class indicative of the occupant's type or position in the vehicle, and classifying the occupant into one of the classes.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
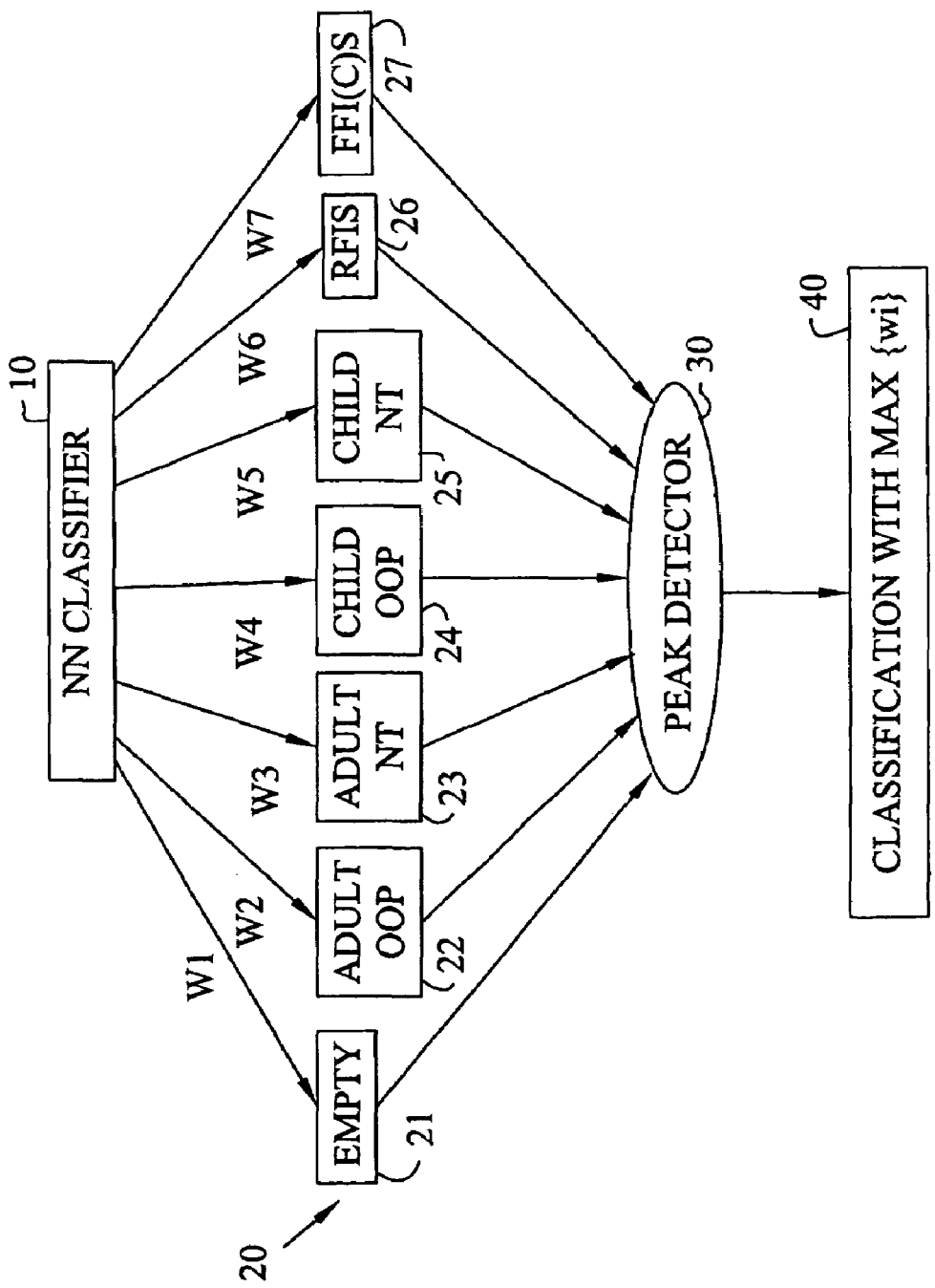
FIG. 1 is a block diagram view of applicant's prior art system.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention in several forms and such exemplification is not to be construed as limiting the scope of the invention in any manner.

DESCRIPTION OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Often used in image recognition systems, a neural network is a type of artificial intelligence that attempts to imitate the way a human brain works by acquiring knowledge through training. Instead of using a digital model such that all computations manipulate zeros and ones, a neural network creates connections between processing elements. The organization and weights of the connections determine the network's output.

For purposes of this invention, the term "static category" hereinafter refers to a category of occupant types. Shown in FIG. 2, static categories 100 include ES category 112, Adult category 113, Child category 114, RFIS category 115 and FFI(C)S category 116. Categories 100 are considered to be static because a change of category typically requires up to a few seconds of update rate. Static categories 100 may include other categories. The term "categorizing" refers to determining in which static category the occupant should be placed by the system.

Static categories 100 each include at least one or more classes or classifications 20 describe either the occupant's type or position in the vehicle. ES category 112 includes ES classification 21, Adult category 113 includes Adult_OOP classification 22 and Adult_NT classification 23, Child category 114 includes Child_OOP classification 24 and Child_NT classification 25, RFIC category 115 includes RFIS classification 26, and FFI(C)S category 116 includes FFI(C)S classification 27. For those categories that contain more than one class, e.g. Adult category 113 and Child category 114, the classifications are considered to be dynamic because a change of classification within the static categories 100 typically requires less than twenty (20) milliseconds update rate. The use of the term "classifying" herein refers to determining in which classification the system should place the occupant.

The term "confidence" relates to the inventive system's certainty in correctly classifying a motor vehicle occupant. The term "boost" hereinafter refers to the inventive system's ability to increase its confidence in making a classification. As described supra, the term "classification confidence" refers to the system's statistical certainty in making a classification.

Figure 2:
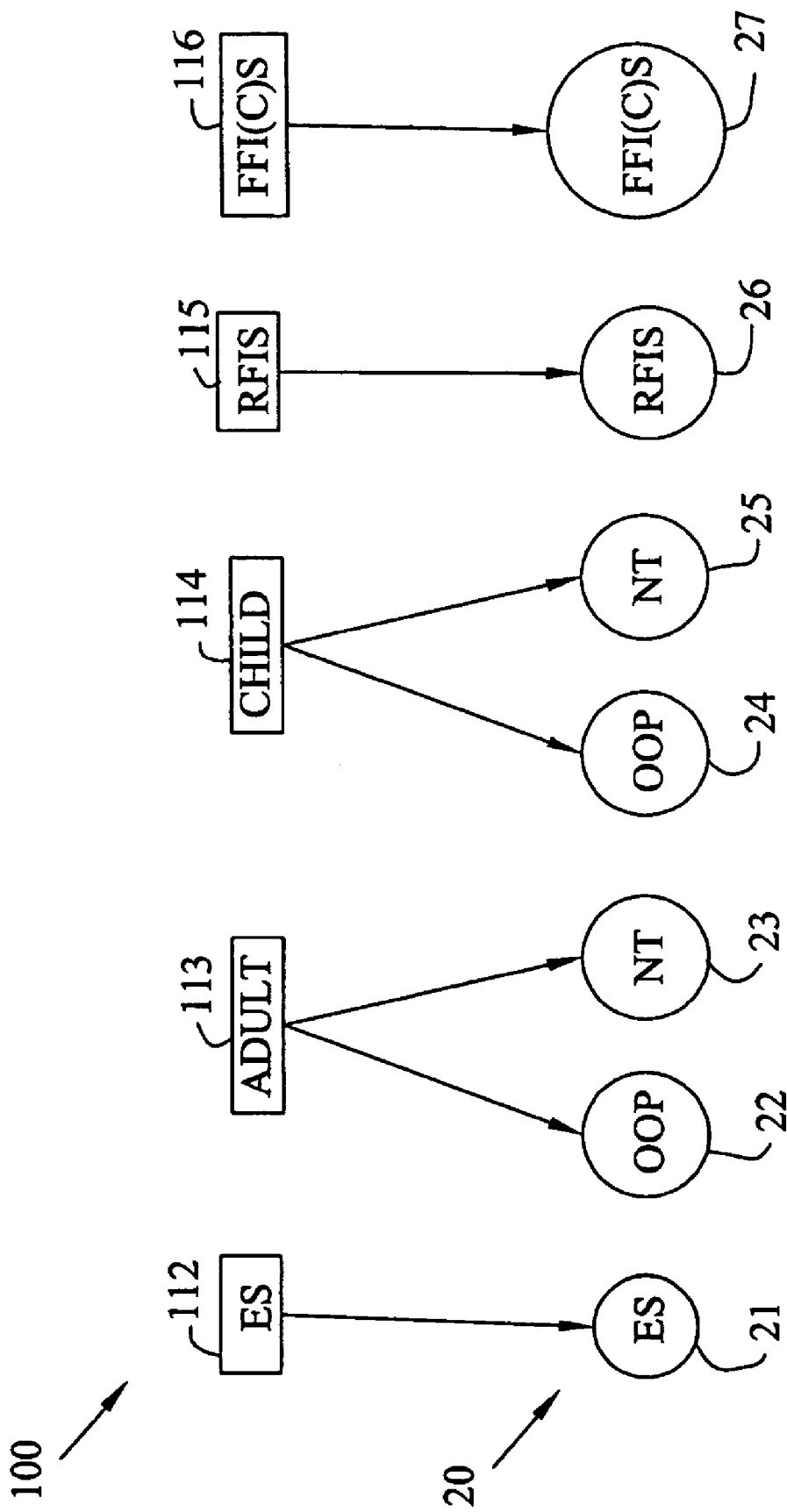
FIG. 2 is a block diagram view of the static categories and classifications of the present invention.

FIG. 2 illustrates the two-tiered functionality structure of the occupant protection system of the present invention. The first tier, categories 100, is for the system's internal reference and serves as a routing mechanism for the system. The second tier, classifications 20, is the system classification output. Adult and Child categories 113, 114 include both NT 23, 25 and OOP classifications 22, 24, respectively, and the rest of categories 100 contain a single classification. This tiered-structure is defined according to the physical constraint that any changes between categories 100 require a new occupant identity. For example, a change between categories may occur when an adult enters the vehicle (category changes from ES 112 to Adult 113) or when a child seat is placed in the vehicle (category changes from ES 112 to FFI(C)S 116 or RFIS 115). Static classification categories 100 are typically applicable to these types of events. Within Adult and Child categories 113, 114, however, the same occupant may change his or her position between NT 23, 25 and OOP 22, 24 classifications, respectively. The occupant position can be changed quickly during vehicle crash events, and it is during these types of events that dynamic classification becomes necessary.

The two-tiered structure serves three main purposes. First, the structure separates classification routings for the system, thereby allowing the system to establish higher classification confidence. Second, the structure provides opportunities for the system to "achieve" higher classification confidence by taking advantage of the less time-constrained static classification. The classification confidence analysis is based on an accumulative effect by observing the relative distribution among the seven weighting parameters of the classifier output in each frame (at one time) and the coherence of that distribution over a number of frames (a period of time). A qualified "high confidence event" occurs (i.e., is "achieved") if a significant dominance of one weighting parameter associated with the corresponding classification is observed every time in a given time period. Third, the structure allows the application of hysteresis to the final classification once a high confidence is achieved for a particular category. The final system classification may be biased towards the high confidence category until a new category emerges with high confidence. Such a hysteresis is critical both in improving the system performance when the classifier output confidence is low and in resisting temporal noises.

Figure 3:
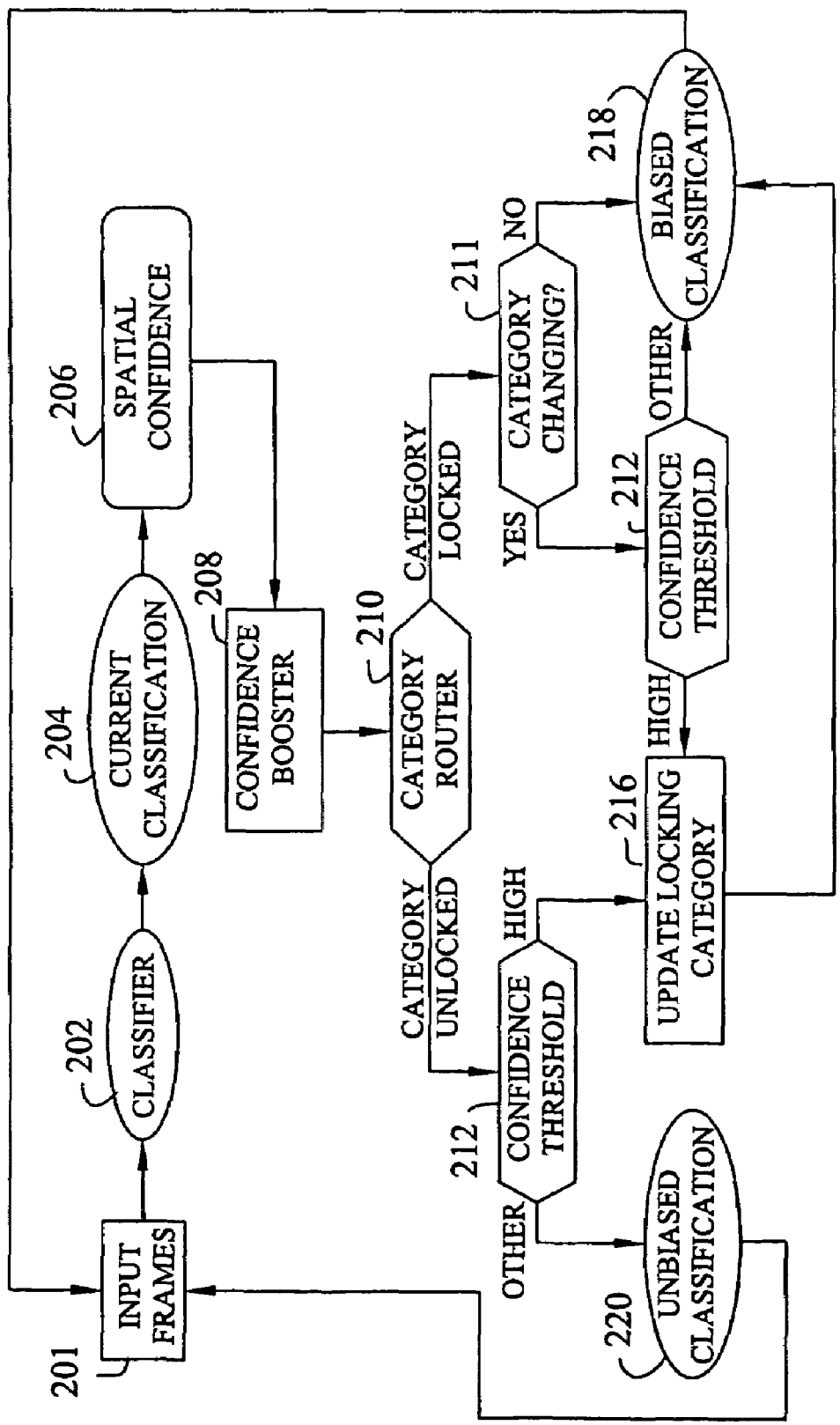
FIG. 3 is a functional block diagram illustrating the method of the present invention.

FIG. 3 shows a functional block diagram illustrating the method of the present invention during a classification event, i.e., an event requiring the classification of a vehicle's occupants. Neural network classifier 202 inputs image features from image frames 201 and outputs a set of weighting parameters $\{w_i\}$ (where i=1, 2, ... 7) that are associated with corresponding occupant classes 21-27 (FIG. 2). An image frame is a single image in a sequence of images that are obtained by image sensors such as those contained in a stereo camera system. Current classification 204 is then determined by the class that is associated with the peak value $w_p$ among all $\{w_i\}$ that are associated with classes 20 in FIG. 1. Spatial confidence 206 in current classification 204 depends on the normalized distribution among $\{w_i\}$ and is evaluated by a classifier confidence factor C (hereinafter referred to as spatial confidence):

$$C = \frac{w_p}{\sum_{i=1}^{7} w_i}$$

Spatial confidence 206 has a value between 0 and 1 and a larger value represents a higher confidence. If the weighting parameters $\{w_i\}$ is already normalized by classifier 202, then $w_p$ itself can be used as spatial confidence 206.

Confidence booster 208 uses both spatial confidence 206 and its consistency over a certain period of time (i.e., temporal confidence) to define and achieve a higher classification confidence that is assured by confidence threshold 212. Spatial confidence 206 is used to achieve a higher classification confidence but is not the result. Accordingly, spatial confidence 206 of current classification 204 can be boosted when a number of consecutive frames 201 are considered together in conjunction with the spatial confidence distribution pattern. A "spatial confidence distribution pattern" is the statistical profile among the weighting parameters $\{w_i\}$ of classifier 10 in FIG. 1 such as their relative strength, ranking, or dominance. Spatial confidence 206 is one qualitative measurement of the spatial confidence distribution pattern. A "temporal distribution pattern" describes the variations of the spatial distribution over time. The consistency of the spatial confidence distribution pattern over a predetermined amount of time can be used as one way of measuring the temporal distribution pattern.

A system confidence criterion is used to define a "high confidence" condition. A "high confidence condition" is the situation when a decision can be made with high certainty. This criterion is met when spatial confidence 206 level of one particular classification 204 remains above a predetermined threshold in every frame within a predetermined number of frames. For example, when one output weighting parameter of classifier 202 is significantly dominant in its value among all other weighting parameters and that dominance is observed constantly over a number of consecutive input frames 201, then the likelihood of a correct classification associated with that parameter becomes higher than any decision that would have been made based on the current classification 204. The process of qualifying a high confidence event is executed only during the static classification that determines the occupant category 100 in FIG. 2. Once the high confidence event is qualified, its associated category will become a preferred reference for future classification. When a category becomes a preferred reference for future classification, this category is referred as a locked category. Until a different category qualifies a high confidence classification event, this category will remain in the locked state. The predetermined number of frames used should correspond to a time period less than the required static classification loop time, and the spatial confidence threshold should be properly chosen according to classifier's 202 statistical characteristics. Statistical characteristics are compiled measurements that indicate when classifier 202 is likely to make correct classifications. For example, classifier 202 may most likely make correct classifications when its spatial confidence 206 is consistently higher than a certain value. Therefore, such a value should be considered for the spatial confidence threshold. A too high or a too low spatial confidence threshold relative to classifier's 202 ability to make a correct classification either decreases the chance to lock a category or decreases the significance of a locked category.

In an exemplary embodiment of the present invention, the spatial confidence threshold is set at 94% and the threshold for the number of frames is set at thirty (30) before a high confidence event is qualified. If the system classification loop time is thirteen (13) frames per second, the high confidence condition takes at least 2.31 seconds to be established. The static classification typically requires less than five (5) seconds for updates.

Category router 210 is used to branch the classification paths according to an internal locked or unlocked category status. An unlocked category status is the system initial default state that remains until the very first high confidence event is qualified for a particular category. Once a category is locked, the system determines at step 211 whether the occupant category provided by current classification 204 is different from the locked category. If it is true, or the category is changing, the system further determines whether the new category is qualified as a high confidence event by confidence threshold 212. If it is not true or the category is not changing, then biased classification 218 is made to determine the occupant's type or position.

Figure 4:
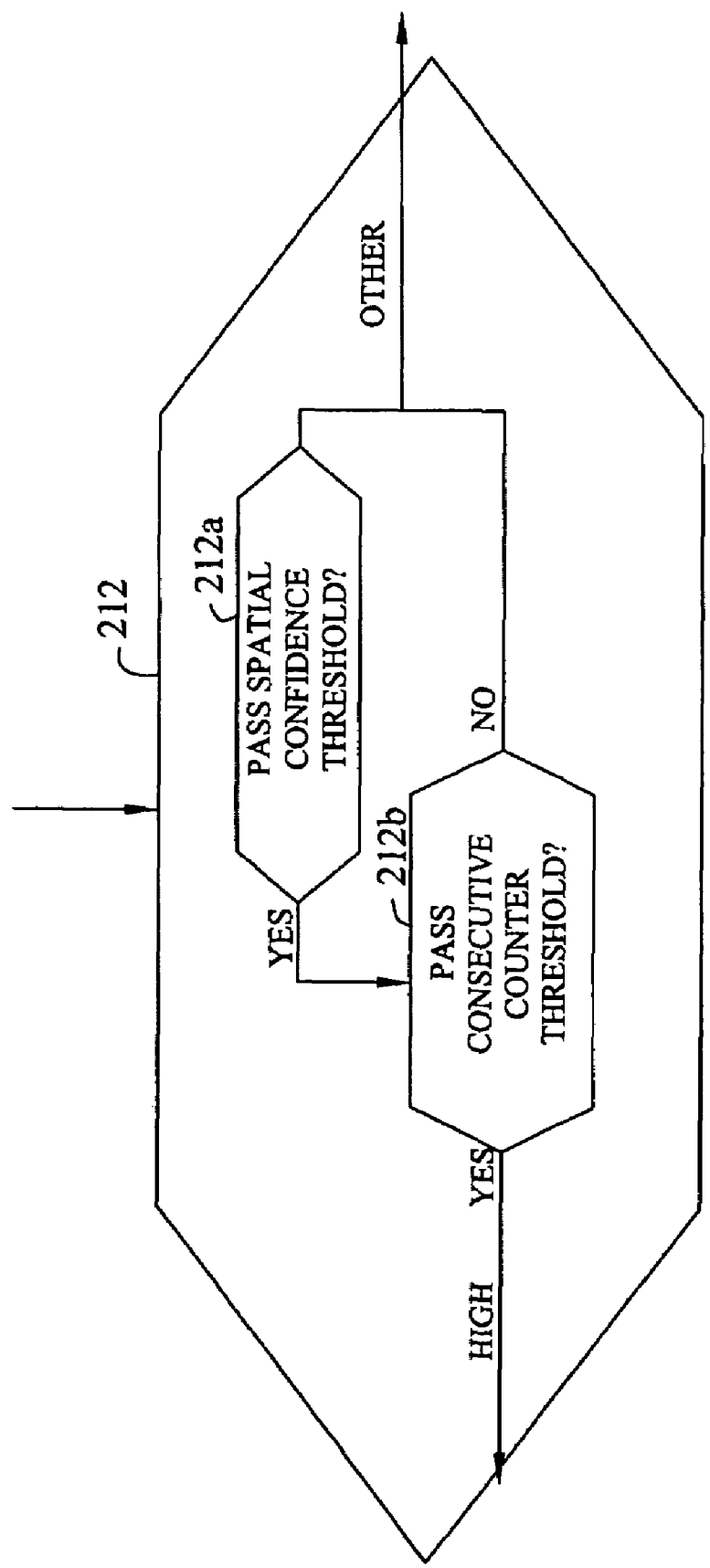
FIG. 4 is a block diagram illustrating the confidence threshold of the present invention.

The determination made at confidence threshold 212 is shown in greater detail in FIG. 4. If the system determines at step 212b (temporal confidence threshold) that a predetermined consecutive counter threshold has been passed, a high confidence event is realized (i.e., the system has high confidence that the category has changed) and the locked/biased category is updated at 216 (FIG. 3) with the new category that can be used by category router 210, the category changing detection 211, and the biased classification 218. If the system determines at either step 212a that the spatial confidence threshold has not been passed or at step 212b that the temporal confidence threshold has not been passed, a low confidence event is realized (i.e., the system has low confidence that the category has changed) and a biased classification 218 is made. The system also makes biased classification 218 if the system determines at step 211 that the category determined by current classification 204 is consistent with the locked category or the category is not changing.

Biased classification 218 limits the final system decision within the locked category regardless of the current frame classification category. The classification is biased towards the already established high confidence condition. If the locked category contains multiple classes, biased classification 218 is the class selected from classifier 202 outputs that is associated with the maximum weighting parameter within the locked category. All other weighting parameters outside the locked category are not considered for the classification regardless of their relative values to those in the locked category. If the locked category contains only one (1) class, this class is the only option for biased classification 218.

Depending on the consistency between the category provided by current frame classification 204 and the locked category, and the classification confidence level qualified by confidence threshold 212, there are different cases in which biased classification 218 may be made. If current frame classification 204 is consistent with the locked category, then current frame classification 204 remains as biased classification 218 even if the current frame spatial confidence 206 level is low because it is considered that the system classification confidence has been boosted by the high confidence of the locked category. The path from category router 210 to category changing detection 211 and then to biased classification 218 indicates this case. Similarly, when a category status has just been updated to a new category (e.g., at 216), the event requires intrinsic coherence (i.e., the current frame classification has to be consistent with the to-be locked new category, and when a new category has just been updated, the current frame classification has to be consistent with that category) between current frame classification 204 and the just updated locking category except that the high confidence condition must be satisfied. Namely, current classification 204 must be consistent or support the new category that is to be updated. In order for a new category to be updated (or a previous locked category to be overturned), the new category must be qualified as a high confidence event by passing confidence threshold 212. The path from category router 210 to category changing detection 211, to confidence threshold 212, to update locking category 211 and then to biased classification 218 belongs to this case. The path from category router 210 to confidence threshold 212, to update locking category 216, and then to biased classification 218 belongs to this case also. If current frame classification 204 is different from the locked category but has lower confidence by failing confidence threshold test 212, the system ignores current classification 204 and applies biased classification 218, with which the occupant will be classified, within the locked category. The path from category router 210 to category changing detection 211, to confidence threshold 212, and then to biased classification 218 indicates this case.

If category router 210 determines that the category is in an unlocked status, the system determines whether confidence threshold 212 has been passed. The category status can be in an unlocked state only if the system is in the initialization stage or in the process of establishing the first locking category. In the unlocked category state, unbiased classification 220 is used to determine the system classification. Unbiased classification 220 may be chosen as a system default class, as an "unknown" class, or as current frame classification 204. In an exemplary embodiment of the present invention, current frame classification 204 is used as unbiased classification 220.

If the system determines that predefined confidence threshold 212 has been passed, then a high confidence condition has been achieved and the system updates the locking category at 216. If the system determines that confidence threshold 212 has not been passed, unbiased classification 220 is made and the system further processes image frames 201.

Figure 5:
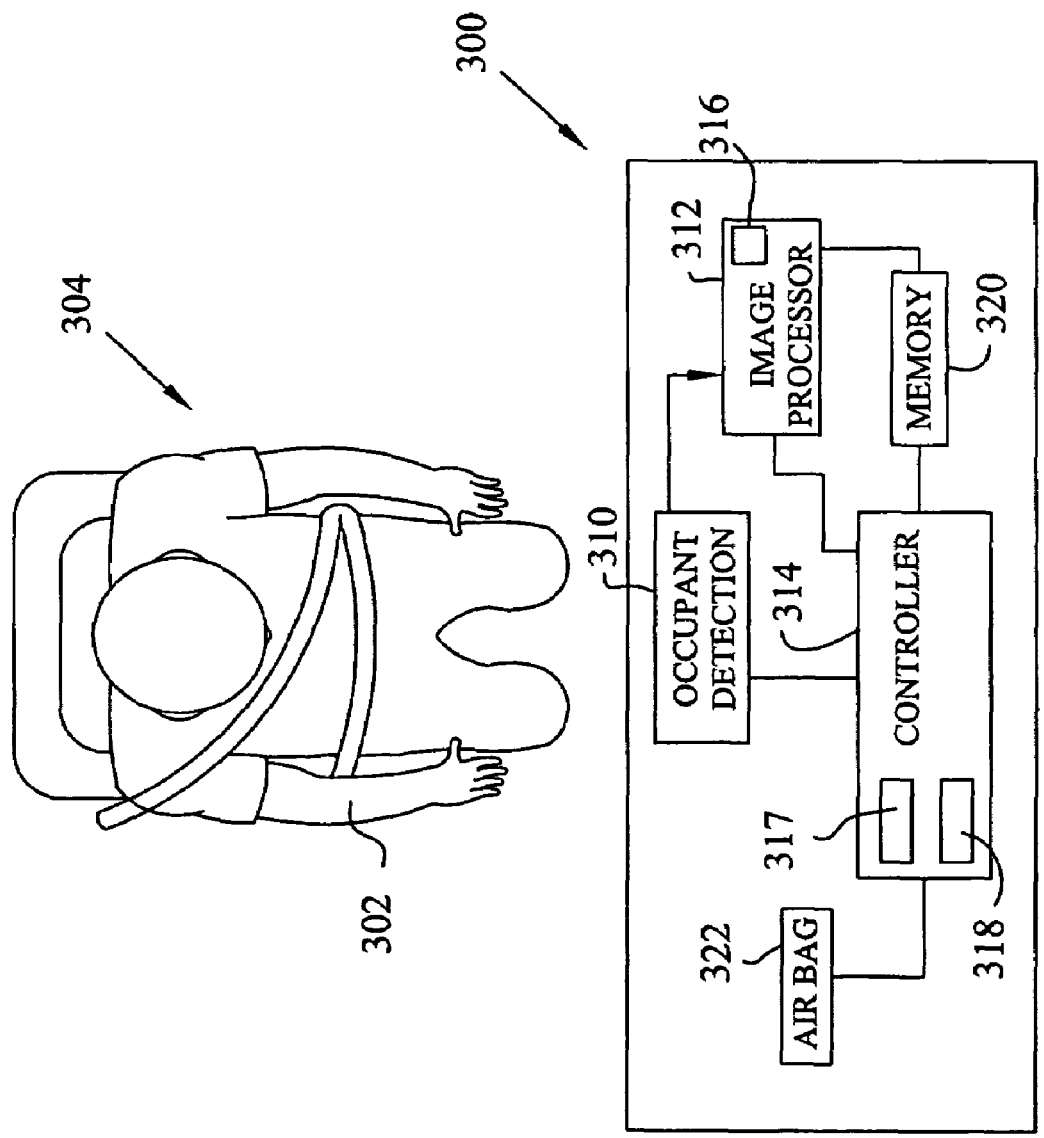
FIG. 5 is a diagrammatic view of the system of the present invention.

A system utilizing the method of the present invention is shown in FIG. 5. System 300 is for use in a vehicle containing occupant 302 positioned in seat 304. System 300 includes occupant detection module 310, image processor 312, controller 314, at least one memory 320 and air bag 322. Image processor 312 includes classifier 316, which is a software algorithm executable by image processor 312. Controller 314 includes microprocessor 317 and air bag module 318.

In an exemplary embodiment of the present invention, occupant detection module 310 includes a stereo vision system that captures the images of the occupant. Occupant detection module 310 may include stereo optical sensors and/or sensing technologies other than vision, e.g., weight based, electric field and infrared.

After images about seat area 304 are obtained by occupant detection module 310, the images are processed by image processor 312. Image processor 312 is used to extract image features from seat area 304 such as stereo image disparities, image edge density distribution and image wavelet coefficients. Classifier 316 uses disparity mapping functions, edge mapping functions and image wavelet features to classify an occupant based on the processed images. In the exemplary embodiment, classifier 316 includes three sub-classifiers that have similar neural network structures but are trained with different conditions. The numerical average of the weighting parameters of the sub-classifiers becomes the input of classifier 316. After stepping through the method of the present invention, classifier 316 then provides the final system classification. Once a final system classification is made, air bag module 318 either deploys air bag 322 or does not, depending on the classification.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A method of classifying an occupant of a motor vehicle, said method comprising the steps of:
   processing a plurality of image frames to detect an occupant;
   categorizing the occupant into one of a plurality of static categories, each of the static categories including at least one class indicative of at least one of an occupant type and a position in the vehicle; and
   classifying the occupant into the at least one class, wherein the step of classifying includes determining a spatial confidence having a consistency over a predetermined period of time, and observing the consistency of the spatial confidence over the predetermined period of time to establish a temporal confidence.

2. The method of claim 1 wherein the at least one class is dynamic.

3. The method of claim 1 further comprising a step of defining a confidence condition, the confidence condition indicating a desired accuracy in the classification of the occupant into the at least one class.

4. The method of claim 3 wherein the step of classifying includes a step of achieving the confidence condition.

5. The method of claim 4 wherein the step of classifying includes a step of locking the one of the plurality of static categories when the confidence condition has been achieved.

6. The method of claim 5 wherein the step of classifying includes a step of limiting the classification of the occupant to the locked one of the plurality of static categories.

7. The method of claim 3 further comprising a step of utilizing the spatial confidence and the temporal confidence to boost the desired accuracy.

8. An occupant position classification system, said system comprising:
   means for capturing a plural of image frames;
   a processor in communication with said means for capturing the image frames; and
   memory accessible by said processor and storing program instructions executable by said processor to perform method steps, the method steps comprising:
   processing the plurality of image frames to detect an occupant;
   categorizing the occupant into one of a plurality of static categories, each of the static categories including at least one class indicative of at least one of an occupant type and a position in the vehicle;
   classifying the occupant into the at least one class;
   determining a spatial confidence distribution pattern of each of the plurality of image frames; and
   determining a temporal distribution pattern of each of the plurality of image frames over a predetermined number of consecutive image frames, wherein the program instructions are executable by said processor to perform a step of defining a confidence condition, the confidence condition indicating a desired accuracy in the classification of the occupant into the at least one class.

9. The occupant position classification system of claim 8 wherein the program instructions are executable by said processor such that said step of classifying includes a step of achieving the confidence condition.

10. The occupant position classification system of claim 9 wherein the program instructions are executable by said processor such that said step of classifying includes a step of locking the one of the plurality of static categories when the confidence condition has been achieved.

11. The occupant position classification system of claim 10 wherein the program instructions are executable by said processor such that said step of classifying includes a step of limiting the classification of the occupant to the locked one of the plurality of static categories.

12. The occupant position classification system of claim 8 wherein the program instructions are executable by said processor to perform a step of utilizing the spatial confidence distribution pattern and the temporal distribution pattern to boost the desired accuracy.

* * * * *